Oct. 25, 1966  J. J. KOSTREWA  3,280,761
BULKHEAD HANDLE ASSEMBLY
Filed March 26, 1965  2 Sheets-Sheet 1
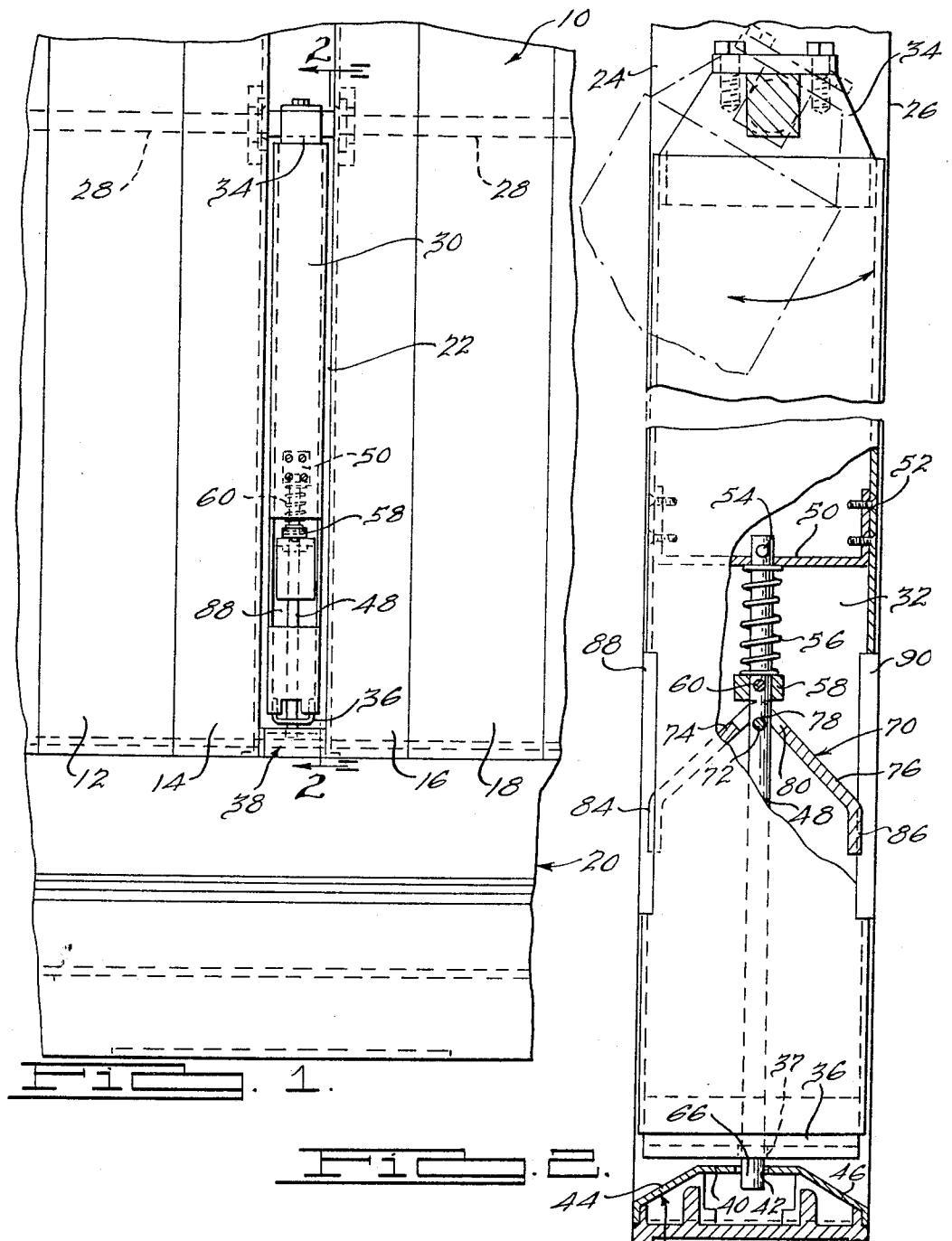
INVENTOR.
John J. Kostrewa.
BY
Harness, Dickey & Pierce
ATTORNEYS.

Oct. 25, 1966   J. J. KOSTREWA   3,280,761
BULKHEAD HANDLE ASSEMBLY
Filed March 26, 1965   2 Sheets-Sheet 2
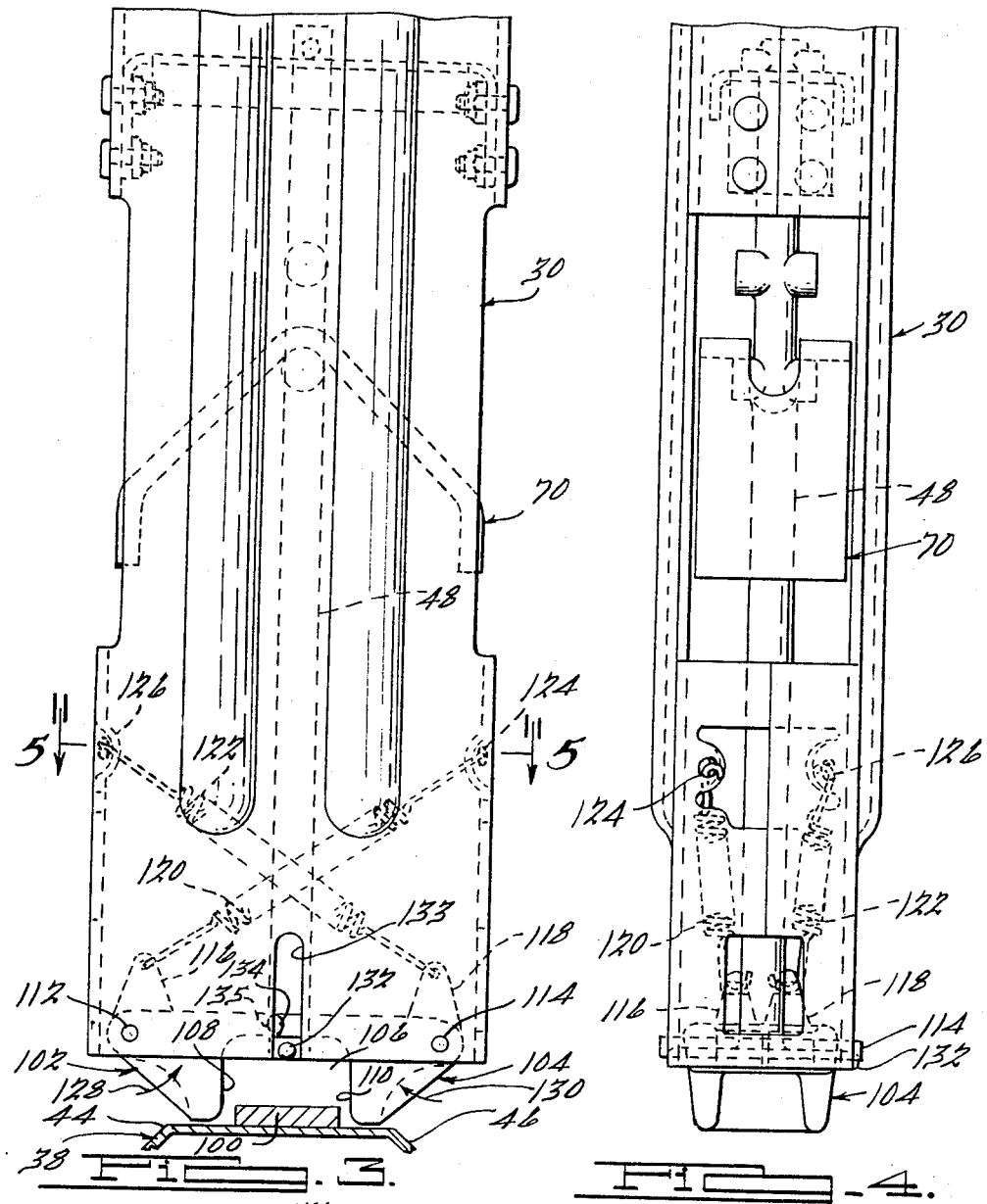
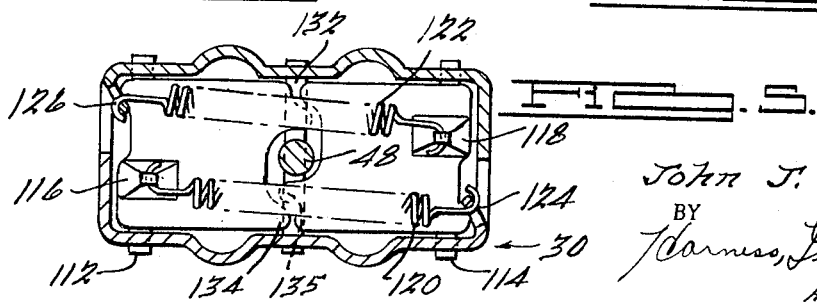
INVENTOR.
John J. Kostrewa
BY
Harness, Dickey & Pierce
ATTORNEYS United States Patent Office 3,280,761
Patented Oct. 25, 1966

3,280,761
BULKHEAD HANDLE ASSEMBLY
John J. Kostrewa, Detroit, Mich., assignor to Evans Products Company, Plymouth, Mich., a corporation of Delaware
Filed Mar. 26, 1965, Ser. No. 446,467
3 Claims. (Cl. 105—376)

This invention relates to cargo handling systems and more particularly to a bulkhead for use therewith and this application is a continuation-in-part of my prior application of the same title, Serial No. 180,770, filed March 19, 1962.

In general, bulkheads of the type to which the present invention relates are utilized in railway boxcars and other vehicles to partition the cargo container space thereof. The bulkheads are movably supported by overhead trolley assemblies for movement along the length of the cargo space. When the bulkheads have been moved into a particular position, locking means are commonly provided to secure the bulkhead in the desired position. The locking means commonly takes the form of a pin arrangement which is operable by suitable linkage between latched and unlatched positions in association with fixedly mounted pin receiving means on the sides of the cargo container. It has been previously proposed to provide a pin actuating and bulkhead positioning handle which may be pivotally mounted in a recess in the bulkhead. The handle is movable from a stowed position within the bulkhead whereat the locking means is in the latched position to an outwardly extending position whereat the locking means is in the unlatched position and whereat the handle may be used by a workman in positioning the bulkhead. In previous apparatus workmen have had difficulty in operating the handles and have at times been unable to securely grasp the handle to move it to a desired operating position.

Accordingly, an object of the present invention is to provide an improved bulkhead handle.

Another object of the present invention is to provide means for grasping a bulkhead handle in any position thereof.

Still a further object of the present invention is to provide an improved bulkhead latch pin actuating device which may be secured in a stowed position in a recess in a bulkhead and moved to a release position extending outwardly from the recess.

A bulkhead assembly embodying this invention has a locking mechanism operated by a manually operable control handle that is pivotally movable from a stowed position within the bulkhead to an actuating position extending outwardly from the bulkhead. Latch means secures the handle in the stowed position and separate manually operable latch release handle means are mounted upon the control handle. The latch release handle is connected to the latch means and is accessible from either side of the bulkhead in any position of the handle to manually actuate the latch release handle.

The foregoing objects, and others are accomplished in the manner hereinafter disclosed in detail by reference to illustrative embodiments shown on the accompanying drawings, wherein:

FIGURE 1 is a partial side elevational view of a bulkhead embodying the principles of the present invention;

FIGURE 2 is a sectional view taken along the line 2—2 in FIGURE 1;

FIGURE 3 is a partial side elevational view, in part similar to FIGURE 2, showing another embodiment of the invention;

FIGURE 4 is an end view of the embodiment shown in FIGURE 3; and

FIGURE 5 is a cross-sectional view taken along the line 5—5 of FIGURE 3.

Referring now in detail to the embodiment shown in FIGURES 1 and 2, a portion of the bulkhead 10 comprising a series of vertically spaced panels 12, 14, 16, 18, etc., mounted on a lower frame assembly 20 is shown. A handle recess is formed in the bulkhead by a central slot 22 extending through the bulkhead from one side 24 to the other side 26. The bulkhead is otherwise conventional in design and includes a trolley assembly which is fixed to the top thereof and associated with a track assembly fixed to the side walls of a cargo container. The bulkhead is movable along the track assembly by rotation of support wheel means of the trolley assembly. Latch means (not shown) are provided on each end of the bulkhead for securing the bulkhead in a desired position along the track means. The latch means are actuable through a linkage arrangement (not shown) by rotation of a shaft element 28 which extends to each end of the bulkhead from the center slot 22.

The handle 30 comprises an elongated four-wall box-like structure having a hollow interior 32. The upper end of the handle 30 is fixedly connected to the shaft 28 by a connecting bracket 34 in any suitable manner. The lower end of the handle 30 is provided with a U-shaped bracket 36 which extends downwardly therefrom and is provided with a centrally located pin hole 37. A striker plate 38 is mounted in the bottom of the slot 22 and includes a central portion 40 having lock receiving means in the form of a pin hole 42 and inclined approach surfaces 44, 46. The pin hole 42 in the striker plate 38 is aligned with the pin hole in the bracket 36 when the handle 30 is in a vertical stowed position within the slot 22.

Locking means in the form of a latch pin 48 is mounted within the cavity 32 in the handle 30 and is slidably supported by a pin bracket 50 which is fixedly secured to the side walls of the handle as shown at 52. The latch pin is movable between a fully downwardly extended position and an upwardly retracted position. A transverse stop pin 54 is affixed to the latch pin 48 on the upper side of the bracket 50 limits downward movement. A compression spring 56 urges the latch pin to the lowered position and is seated at one end on the bracket 50 and at the other end on an abutment collar 58. A pin 60 secures the collar 58 to the latch pin. In the lowered position, the lower end 66 of the pin 48 is extended through the hole 37 in the bracket 36 and is received by the hole 42 in the striker plate 38.

A latch pin release handle 70 is associated with the latch pin 43 between the stop collar 58 and a transversely extending rocking pin 72. The latch pin release handle 70 is formed from a plate having a pair of downwardly and outwardly sloping side walls 74, 76 joined by a right angle bend 78 which forms a seat for the pin 72. The latch pin release handle is centrally notched at 80 in the area of the bend 78 to accommodate the latch pin 48. The end portions 84, 86 of each of the side walls 74, 76 of the handle are obliquely bent relative thereto to extend vertically in the stowed position of the handle 30. The latch pin release handle is accessible through oppositely located access ports 88, 90 provided in the side walls of the handle 30 facing the open ends of the slot 22.

In operation of the apparatus, the handle 30 is located in the vertical stowed position within the slot 22 and the latch pin 48 is secured within the latch pin hole 42 when the bulkhead is locked in a preselected position. The latch pin 48 is biased downwardly by the compression spring into latching engagement with the latch pin hole 42 in the striker plate 38. When it is desired to unlatch the bulkhead for movement to a new position, a workman may reach through either of the access openings 88, 90 from either side of the bulkhead to grasp one or the other of the holding portions 84 or 86 of the latch pin release handle 70. By grasping one side of the latch pin release handle and lifting upwardly, the latch pin 48 can be moved vertically upwardly out of the latch pin hole 42. When one side of the latch pin release handle is lifted upwardly it pivots on the pin 72 about the seat 78 formed by the right angle bend. The upper surfaces of the side wall portion 76 or 74 adjacent the right angle bend which is being lifted upwardly will be brought into engagement with the fixed collar 58. The other holding portion opposite to the one being lifted will be rotated downwardly and inwardly into abutting engagement with the adjacent side of the latch pin 48. Further upward lifting movement at that time results in compression of the spring 56 and upward displacement of the latch pin 48 to a released position. The workman may then pull the operating handle 30 outwardly to release the bulkhead latching means by rotation of the shaft 28.

During manipulation of a bulkhead in a container, the handle 30 may at times be left in a position extending outwardly at approximately 45° from the bulkhead. In prior apparatus it was virtually impossible for a workman to grasp the handle for actuation of the bulkhead latching means or manipulation of the bulkhead when the workman was on the side of the bulkhead opposite the handle. The present handle releasing means 70 provides a convenient way of grasping the handle 30 to pull it through the slot 32 when the handle is positioned oppositely from the workman. When the handle 30 is outwardly inclined the bulkhead, the latch release means 70 will automatically assume a vertically extending position by gravity with the lowermost portions 84 or 86 extending vertically through the adjacent access opening 88 or 90. The latch release means 70 is loosely slidably mounted relative to the latch pin 48 so that it will be able to acquire a vertical position regardless of the attitude of the handle 30. Furthermore, during manipulation of the handle 30, and particularly in the vertical position thereof, forces exerted on the shaft 28 through the control linkage of the bulkhead latch means exert a force which is difficult for a workman to overcome unless he can obtain a good grip and leverage on the handle. The latch release means 70 provides a good gripping surface and adequate leverage in all positions of the handle 30 regardless of the location of the workman.

FIGURES 3 through 5 illustrate another embodiment wherein a slightly different form of locking device is provided for locking the operating handle 30 in its position within the bulkhead. Several parts of the locking device shown in this embodiment are similar to those of the previously described embodiment and these parts are identified by the same reference numerals as previously used.

Referring now in detail to FIGURES 3 through 5, the striker plate 38 having the inclined approach surfaces 44 and 46 is provided with an abutment block 100 that is affixed to the upper surface of the striker plate 38 as by welding. The abutment block 100 forms one interengaging part of a latch device, as did the latch pin hole 42 in the previous embodiment.

Interengaging latching means that coact with the abutment block 100 are carried by the handle 30. These means comprise a pair of pivotally mounted latch elements 102 and 104 that define a substantially rectangular cavity 106 therebetween. The abutment block 100 is adapted to be received in the cavity 106 between opposing surfaces 108 and 110 of the latch elements 102 and 104, respectively, in the stowed position of the handle 30. The surfaces do not contact the block 100 when the operating handle 30 is in the vertical position. They will contact the block if the handle is displaced from this position without releasing the latch elements 102 and 104.

The latch elements 102 and 104 are pivotally mounted upon pivot pins 112 and 114 affixed to the handle 30 and are provided with upwardly extending ear portions 116 and 118. Coil tension springs 120 and 122 are connected at one of their ends to the ear portions 116 and 118 and at their other ends to the side walls of the handle 30, as at 124 and 126. The springs 120 and 122 are utilized to bias the latch elements 102 and 104 to the latching position shown in FIGURE 3 and to enable the latch elements to be yieldably displaced about the pivot pins 112 and 114 in the direction of the arrows 128 and 130.

As in the previously described embodiment, the latch device that is operative between the handle 30 and the striker plate 38 is actuated by a latch release means 70 in the form of a handle and a reciprocally supported pin 48. In this embodiment, however, the pin 48 does not itself function as one of the latch devices. A cross pin 132 is affixed to the bottom of the pin 48 and extends transversely across the handle 30. Slots 133 in each of the opposite side walls of the handle 30 permits the cross pin 132 to be moved in a vertical direction. The cross pin 132 is adapted to contact inwardly extending ears 134 and 135 of the latch elements 102 and 104, respectively.

When it is desired to release the handle assembly 30, the latch release handle 70 is raised drawing the pin 48 upward. The cross pin 132 contacts the ears 134 and 135 to rotate the latch levers 102 and 104 about the pivot pins 112, 114 in the direction of the arrows 128 and 130. There is sufficient clearance between the faces 108 and 110 and the block 100 to permit the levers 102 and 104 to clear the block. The handle 30 may then be rotated to unlatch the bulkhead. When the latch operating handle 70 is released, the springs 122 and 120 will again return the levers 102 and 104 to their normal position. If the handle 30 is swung into the recess within the bulkhead, one or the other of the latch elements 102 and 104 will contact the block 100, depending upon the side of the bulkhead the handle 30 had been extended from. When the handle 30 is returned to its storage position, the latch element that contacts the block 100 may pivot in the direction of the arrow 128 or 130 about the pivot pin 112 or 114 through yielding of the spring 120 or 122. When the block 100 is in registry between the latch elements 102, 104 they will again rotate to the position shown in FIGURE 3 to retain the handle in its storage position.

Accordingly, it may be seen that bulkhead control arrangements have been provided which greatly facilitate positioning of a bulkhead by workmen. Since the inventive principles herein disclosed may have application in alternative embodiments, it is intended that the scope of this invention, as defined by the appended claims, include alternative applications of the invention principles herein disclosed.

The invention claimed is:

1. In a bulkhead having a control handle movable from a stowed vertical position in a control handle recess in said bulkhead to a control position extending outwardly therefrom, said control handle comprising an elongated four-wall casing, latch means mounted within said casing for vertical movement relative thereto, a striker plate mounted in the bottom of said control handle recess in said bulkhead, said striker plate having inclined approach surfaces sloping downwardly and outwardly toward each side of said bulkhead, latch receiving means between said approach surfaces, spring means biasing said latch means toward said latch receiving means, latch release means associated with said latch means to counteract the bias of said spring means and remove said latch means from said latch receiving means, said latch release means comprising a plate divided into two portions at a right angle bend, seat means formed by said right angle bend, support means loosely supporting said latch release means on said latch means, abutment means located above said right angle bend and fixedly secured to said latch means, and access openings provided in said control handle to permit a workman to grasp said latch release means and lift said latch means to an unlatched position against the bias of said spring means.

2. A release mechanism comprising pin means, means supporting said pin means for movement between latched and unlatched positions, spring means for biasing said pin means to said latched position, a pair of fixed abutment means secured to said pin means and defining a gap therebetween, pin release means comprising a plate divided into separate handle portions by a substantially right angle bend, said right angle bend forming seats for engagement with said abutment means, a centrally located aperture provided in said pin release means in the bend area, said pin release means being supported in the gap between said fixed abutment means upon said pin means with said pin means extending through said centrally located aperture for loosely mounting said pin release means upon said pin means, and said handle portions extending outwardly from pin means to enable a workman to grip and lift the pin release means and displace said pin means against the bias of said spring means.

3. In a bulkhead having a control handle movable from a stowed vertical position in a control handle recess in said bulkhead to a control position extending outwardly therefrom, said control handle comprising an elongated four wall casing, latch means mounted within said casing for movement relative thereto, said latch means comprising a pair of latch elements supported for pivotal movement at the lower end of said control handle and having facing latching surfaces, a striker plate mounted in the bottom of said control handle recess in said bulkhead, a latch member supported upon said striker plate and having opposed surfaces adapted to be received between said latch element latching surfaces, spring means biasing said latching surfaces toward said latch member, latch release means associated with said latch elements to counteract the bias of said spring means and pivot said latch elements to a disengaged position, said latch release means comprising a plate divided into two portions at a right angle bend, seat means formed by said right angle bend, support means loosely supporting said latch release means on a portion of said latch means, abutment means located above said right angle bend and fixedly secured to said latch means portion, and access openings provided in said control handle to permit a workman to grasp said latch release means and lift said latch means to an unlatched position against the bias of said spring means.

References Cited by the Examiner

UNITED STATES PATENTS

| 1,004,388 | 9/1911 | Dickert | 74—527 |
| 2,764,440 | 9/1956 | Marko | 292—173 |
| 3,018,741 | 1/1962 | Loomis et al. | 105—376 |
| 3,063,388 | 11/1962 | Magarian et al. | 105—376 |
| 3,209,707 | 10/1965 | Erickson et al. | 105—376 |

ARTHUR L. LA POINT, *Primary Examiner.*

DRAYTON E. HOFFMAN, *Examiner.*